United States Patent

Sazuka et al.

(10) Patent No.: US 6,951,416 B2
(45) Date of Patent: Oct. 4, 2005

(54) VEHICLE HEADLAMP

(75) Inventors: Kiyoshi Sazuka, Shizuoka (JP);
Hiroyuki Ishida, Shizuoka (JP);
Masashi Tatsukawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 70 days.

(21) Appl. No.: 10/652,042

(22) Filed: Sep. 2, 2003

(65) Prior Publication Data

US 2004/0105275 A1 Jun. 3, 2004

(30) Foreign Application Priority Data

Sep. 3, 2002 (JP) .................................. P.2002-258100

(51) Int. Cl.⁷ .................................................. B60Q 1/04
(52) U.S. Cl. ........................ 362/538; 362/545; 362/507
(58) Field of Search ............................... 362/543–545, 362/507, 487, 469, 246, 227, 538, 539

(56) References Cited

U.S. PATENT DOCUMENTS

| | | | | |
|---|---|---|---|---|
| 4,277,819 A | * | 7/1981 | Sobota et al. ............... | 362/545 |
| 6,241,373 B1 | * | 6/2001 | Kelley et al. ............... | 362/545 |
| 6,657,393 B2 | * | 12/2003 | Natsume ...................... | 315/82 |
| 2001/0019486 A1 | | 9/2001 | Thominet | |
| 2001/0028565 A1 | | 10/2001 | Ishida | |

FOREIGN PATENT DOCUMENTS

| | | |
|---|---|---|
| JP | 59-134022 A | 8/1984 |
| JP | 2001-266620 A | 9/2001 |
| JP | 2001-291901 A | 10/2001 |
| JP | 2002-50214 A | 2/2002 |

\* cited by examiner

*Primary Examiner*—Ali Alavi
(74) *Attorney, Agent, or Firm*—Sughrue Mion, PLLC (57) ABSTRACT

A vehicle headlamp is configured to have a plurality of lamp units employing light-emitting diodes as light sources. One lamp unit takes as a light source a light-emitting diode into which a single light-emitting chip is packaged. Other lamp units may take as light sources light-emitting diodes into which a plurality of light-emitting diodes are packaged. A diffusion area is formed by means of radiation of light output from the lamp units.

8 Claims, 12 Drawing Sheets

VEHICLE HEADLAMP

BACKGROUND OF THE INVENTION

1. Field of the Invention

The invention relates to a vehicle headlamp constructed so as to constitute a predetermined light distribution pattern. More particularly, the invention relates to a vehicle headlamp that employs light-emitting diodes packaged in various, efficient numerical combinations and arrangements as light sources.

2. Description of the Related Art

A light-emitting diode has been used as a light source of a vehicle marker lamp such as a tail lamp. For instance, JP-A-2002-50214 describes a vehicle marker lamp in which a plurality of lamp units, each unit using a light-emitting diode as a light source, are arranged.

JP-A-2001-266620 describes a vehicle headlamp. The headlamp is constructed such that a desired light distribution pattern is formed by selectively illuminating a portion of a plurality of light-emitting diodes arranged in a matrix layout.

The lamp configuration described in JP-A-2001-266620 enables changing of shape of a light distribution pattern by division into an illuminating region and a non-illuminating region but encounters difficulty informing a light distribution pattern with a desired distribution of luminous intensity.

Another conceivable lamp configuration can be applied to the vehicle headlamp, such as that described in JP-A-2002-50214, wherein a plurality of lamp units, each unit employing a light-emitting diode as a light source, are arranged. However, in such a case the following problem will arise.

Mere use of a plurality of identical lamp units in the manner as described in JP-A-2002-50214 results in light distribution patterns formed through radiation of light from the respective lamp units becoming identical with each other in terms of a pattern shape and the distribution of luminous intensity. Therefore, there arises a problem of the inability to elaborately control a light distribution pattern of a vehicle headlamp obtained as a resultant light distribution pattern so as to attain a desired distribution of luminous intensity.

The invention has been conceived in view of the circumstances and aims at providing a vehicle headlamp which is constructed to form a predetermined light distribution pattern and enables elaborate control of distribution of luminous intensity of the light distribution pattern even when a semiconductor light-emitting element is used as a light source of the headlamp.

SUMMARY OF THE INVENTION

The present invention aims at achieving the object by adopting a configuration with a plurality of lamp units using semiconductor light-emitting elements as light sources and by making contrivance to the configuration of the respective semiconductor light-emitting elements.

Specifically, a vehicle headlamp of the invention is constructed so as to form a predetermined light distribution pattern and comprises:

a plurality of lamp units employing semiconductor light-emitting elements as light sources, wherein a first lamp unit having a light source formed from a semiconductor light-emitting element into which a single light-emitting chip is packaged and a second lamp unit having a light source formed from a semiconductor light-emitting element into which a plurality of light-emitting chips are packaged are employed as the plurality of lamp units.

Here, the term "vehicle" can apply to any number of transportation modes such as, for example, an automobile, a railcar, etc.

The "semiconductor light-emitting element" is not limited to any specific type. For example, a light-emitting diode, a laser diode, or the like element can be adopted.

The terms "first lamp unit" and "second lamp unit" are not particularly limited to any specific lamp configuration or any specific number, so long as the units employ semiconductor light-emitting elements as light sources.

The semiconductor light-emitting element constituting the light source of the "second lamp unit" is not particularly limited in terms of the number of light-emitting chips to be packaged or the layout thereof, so long as a plurality of light-emitting chips are packaged.

As shown by the configuration set forth, a vehicle headlamp of the invention is equipped with a plurality of lamp units employing semiconductor light-emitting elements as light sources, wherein a first lamp unit having a light source formed from a semiconductor light-emitting element into which a single light-emitting chip is packaged and a second lamp unit having a light source formed from a semiconductor light-emitting element into which a plurality of light-emitting chips are packaged are employed as the plurality of lamp units. Therefore, the following working-effect can be yielded.

Namely, the light source of the first lamp unit is formed from a semiconductor light-emitting element having a single light-emitting chip packaged therein. A small light distribution pattern can be formed by radiation of light output from the lamp unit. A light source of the second lamp unit is formed from a semiconductor light-emitting element into which a plurality of light-emitting chips are packaged. A luminous area of the light-emitting element becomes large. Hence, a large, bright light distribution pattern can be formed by radiation of light from the lamp unit.

Consequently, active use of the second lamp unit enables ensuring of required brightness without involvement of an increase in the number of lamp units. Further, adequate use of the first lamp unit enables easy formation of a spot-like light distribution pattern at a predetermined position and in the form of a predetermined pattern. As a result, there is realized elaborate control of a light distribution pattern of the vehicle headlamp formed as a synthetic light distribution pattern of the light distribution pattern such that a desired distribution of luminous intensity is yielded.

According to the invention, the vehicle headlamp configured to form a predetermined light distribution pattern enables elaborate control of a distribution of luminous intensity of a light distribution pattern even when a semiconductor light-emitting element is used as a light source. Further, the control can be implemented while the number of lamp units to be used is minimized.

The vehicle lamp of the invention is configured to equip a plurality of lamp units, each unit using a semiconductor light-emitting element as a light source. Hence, each lamp unit can be miniaturized. As such, a degree of freedom of a vehicle headlamp can be increased, thereby enabling an attempt to render the vehicle headlamp compact.

By means of the configuration, if the first lamp unit is configured to effect radiation of light to be used for forming a hot zone of a light distribution pattern and the second lamp unit is configured to effect radiation of light to be used for forming a diffusion area of the light distribution pattern, the following working-effect can be yielded.

Specifically, a vehicle headlamp is usually configured to effect radiation of light to be used for forming a high-beam light distribution pattern or a low-beam light distribution pattern. In any case, when radiation is performed for forming either of the light distribution patterns, a hot zone, which is a high intensity region, is formed in a substantial center of the light distribution pattern for enhancing the visibility of a distant area on the road surface ahead of the vehicle. The hot zone is preferably as bright as possible. When an attempt is made to form a hot zone through radiation of light output from the lamp unit that adopts, as a light source, a light-emitting diode into which a plurality of light-emitting chips are packaged, the hot zone becomes considerably large. An increase in the size of the hot zone is preferable. However, if the vertical width of the hot zone has become excessively large, a portion of the distant area on the road surface ahead of the vehicle, the portion being close to the driver, becomes considerably bright, which may in turn further deteriorate the visibility of the distant area.

The first lamp unit is configured to effect radiation of light for forming a hot zone of the light distribution pattern. The second lamp unit is configured to effect radiation of light for forming a diffusion area of the light distribution. As a result, the vertical width of the hot zone can be prevented from becoming larger than required while required brightness of the light distribution pattern is ensured. As a result, the visibility of the distant area on the road surface ahead of the vehicle can be sufficiently ensured.

In relation to the configuration, when the light distribution pattern is a low-beam light distribution pattern, the hot zone must be formed while occurrence of upward light attributable to glaring is prevented. Using the first lamp unit capable of forming a small light distribution pattern as a lamp unit for forming a hot zone is particularly effective. Further, when the light distribution pattern is a low-beam light distribution pattern, another spot-like light distribution pattern; e.g., a light distribution pattern for radiating a overhead sign, can be formed through radiation of light output from the first lamp unit.

DETAILED DESCRIPTION OF THE INVENTION

An embodiment of the invention will be described hereinbelow by reference to the drawings.

Figure 1:
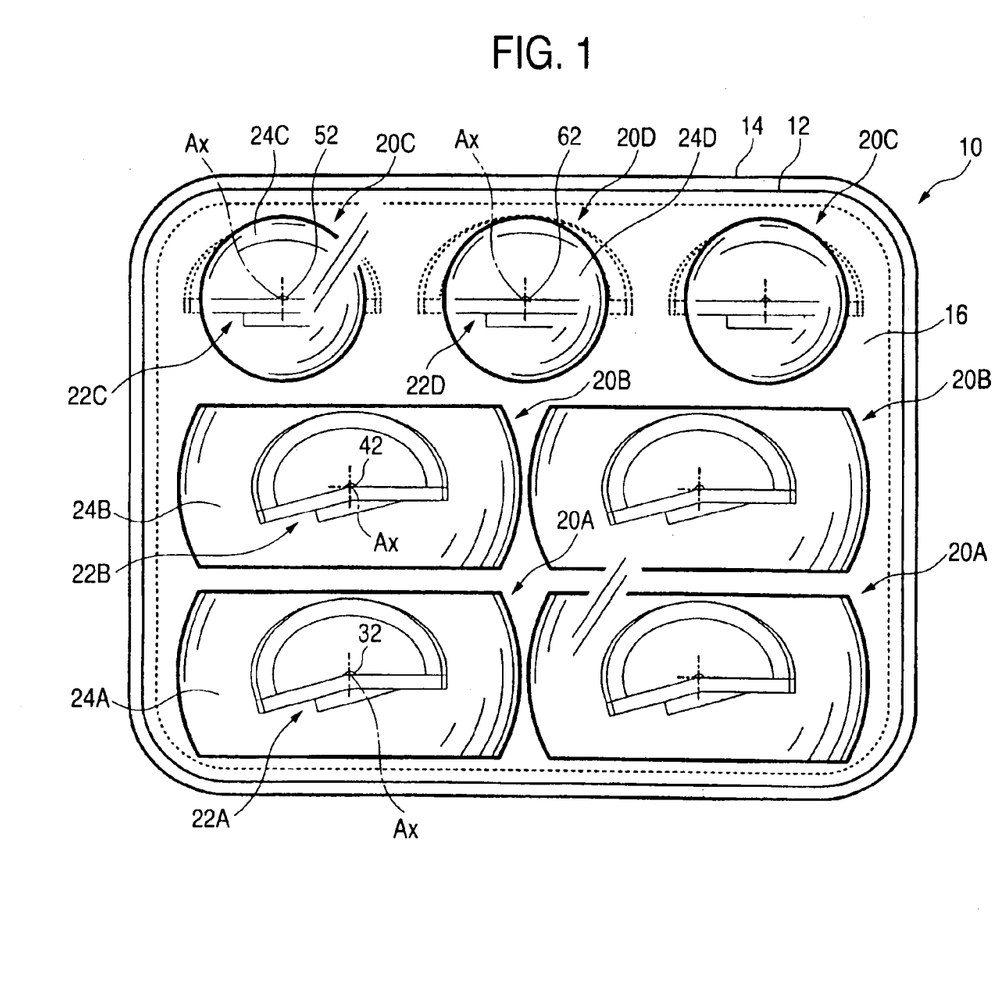
FIG. 1 is a front view showing a vehicle headlamp according to an embodiment of the invention.

FIG. 1 is a front view showing a vehicle headlamp 10 according to an embodiment of the invention.

The vehicle headlamp 10 is a low-beam headlamp. The headlamp is constituted so as to house seven lamp units 20A, 20B, 20C, and 20D in three rows within a lamp chamber, which is formed from a transparent translucent cover 12 and a lamp body 14. In the embodiment, the lamp unit 20A of the plurality of lamp units constitutes a first lamp unit, and the remaining lamp units 20B, 20C, and 20D each constitute a second lamp unit.

Figure 2:
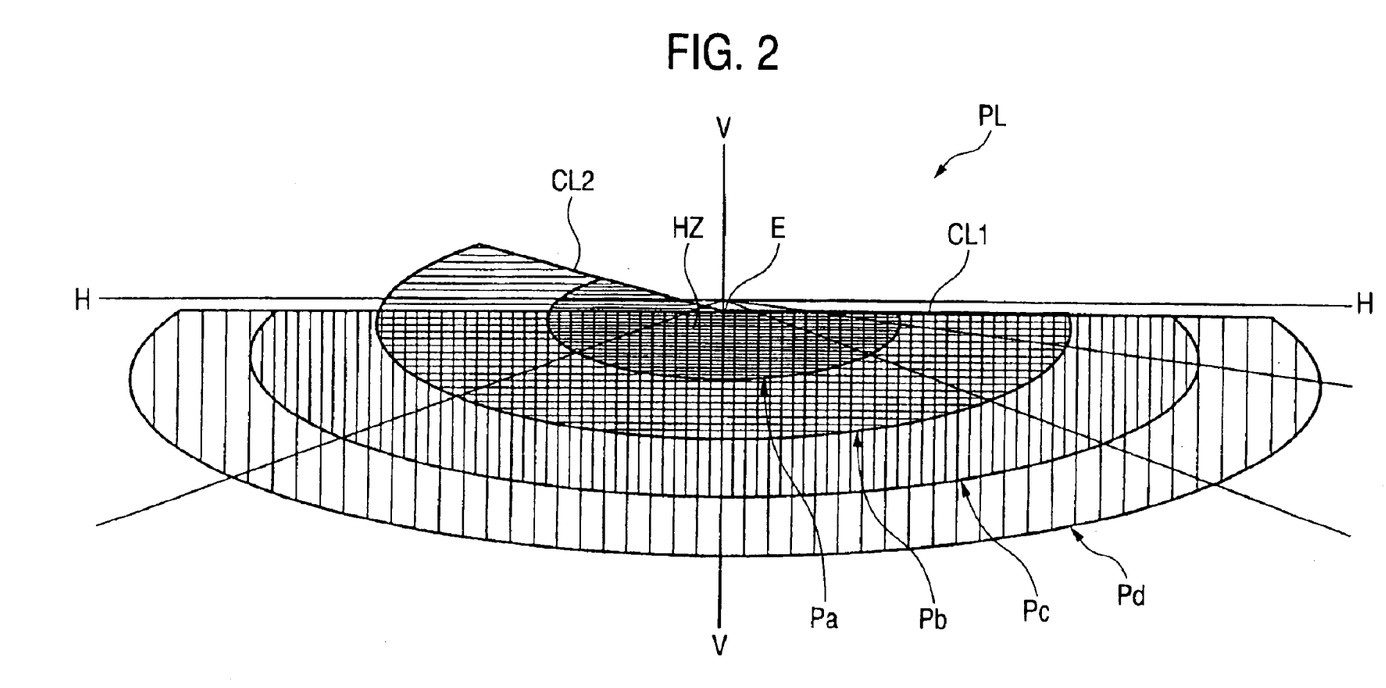
FIG. 2 is a view perspective view showing a low-beam light distribution pattern to be formed on a virtual vertical screen located at a position 25m ahead of the lamp by means of radiation of light output from the vehicle headlamp.

FIG. 2 is a perspective view for showing a low-beam light distribution pattern PL formed on a virtual vertical screen placed at a position 25m ahead of a lamp by means of the light output forward from the vehicle headlamp 10.

The low-beam light distribution pattern PL is a left light distribution pattern having a horizontal cut-off line CL1 and an oblique cut-off line CL2 provided at an upper end of the light distribution pattern. The position of an elbow point E, which is a point of intersection of the cut-off lines CL1 and CL2, is set to a location situated about 0.5° to 0.6° lower than a point H-V, which is a focal point in the direction of front of the lamp. A hot zone HZ, which is a high-intensity area, is formed in the low-beam light distribution pattern PL so as to surround the elbow point E.

The low-beam light distribution pattern PL is formed as a synthetic light distribution pattern from a hot zone formation pattern Pa, a cut-off line formation pattern Pb, an intermediate diffusion pattern Pc, and a wide diffusion pattern Pd.

The hot zone formation pattern Pa is a comparatively small light distribution pattern to be used for forming the hot zone HZ. The hot zone formation pattern Pa is formed by radiation of light output from the two lamp units 20A provided in a lower row.

The cut-off line formation pattern Pb is a light distribution pattern to be used for forming a horizontal cut-off line CL1 and an oblique cut-off line CL2 and is formed as a light distribution pattern larger than the hot zone formation pattern Pa. The cut-off line formation pattern Pb is formed from the two lamp units 20B provided in the middle row.

The intermediate diffusion pattern Pc and the wide diffusion pattern Pd are light distribution patterns for imparting sufficient diffusion to the low-beam light distribution pattern PL. The intermediate diffusion pattern Pc is formed as a light distribution pattern which is larger than the cut-off line formation pattern Pb to a certain extent. The wide diffusion pattern Pd is formed as a light distribution pattern which is much larger than the intermediate diffusion pattern Pc. By means of the patterns, the distribution of luminous intensity of the low-beam light distribution pattern PL is arranged such that luminous intensity becomes gradually lower toward an edge section of the light-distribution pattern. The intermediate diffusion pattern Pc is formed from the two lamp units 20C provided at the respective ends in the upper row. The wide diffusion pattern Pd is formed from one lamp unit 20D located at the center of the upper row.

The respective lamp units 20A, 20B, 20C, and 20D are constituted, as projector-type lamp units, of light source units 22A, 22B, 22C, and 22D, each unit having a light-emitting diode (which will be described later) as the light source, and projection lenses 24A, 24B, 24C, and 24D provided forward thereof. Optical axes Ax of the respective lamp units 20A, 20B, 20C, and 20D are arranged so as to extend in the longitudinal direction of the vehicle. To be precise, at that time, the respective optical axes Ax extend in a direction oriented downward by about 0.5° to 0.6° with respect to the horizontal direction.

The projection lenses 24A, 24B are formed in the form of horizontally-oriented elliptical shapes when the lamp is viewed from the front. The projection lenses 24C, 24D are formed into circular shapes when the lamp is viewed from the front. An inner panel 16 formed so as to surround the projection lenses 24A, 24B, 24C, and 24D is provided within the lamp chamber.

Specific configurations of the respective lamp units 20A, 20B, 20C, and 20D will now be described.

First, the configuration of the lamp unit 20A will be described.

Figure 3:
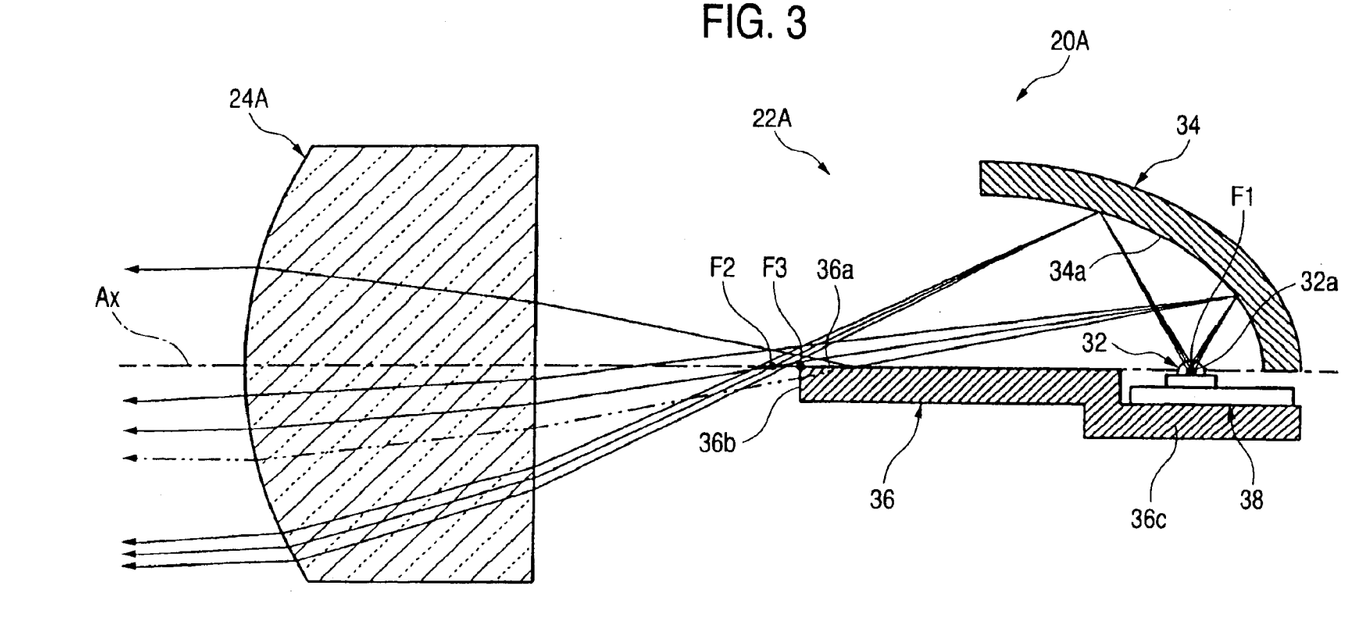
FIG. 3 is a side cross-sectional view showing a first lamp unit of the vehicle headlamp as a single article.
Figure 4:
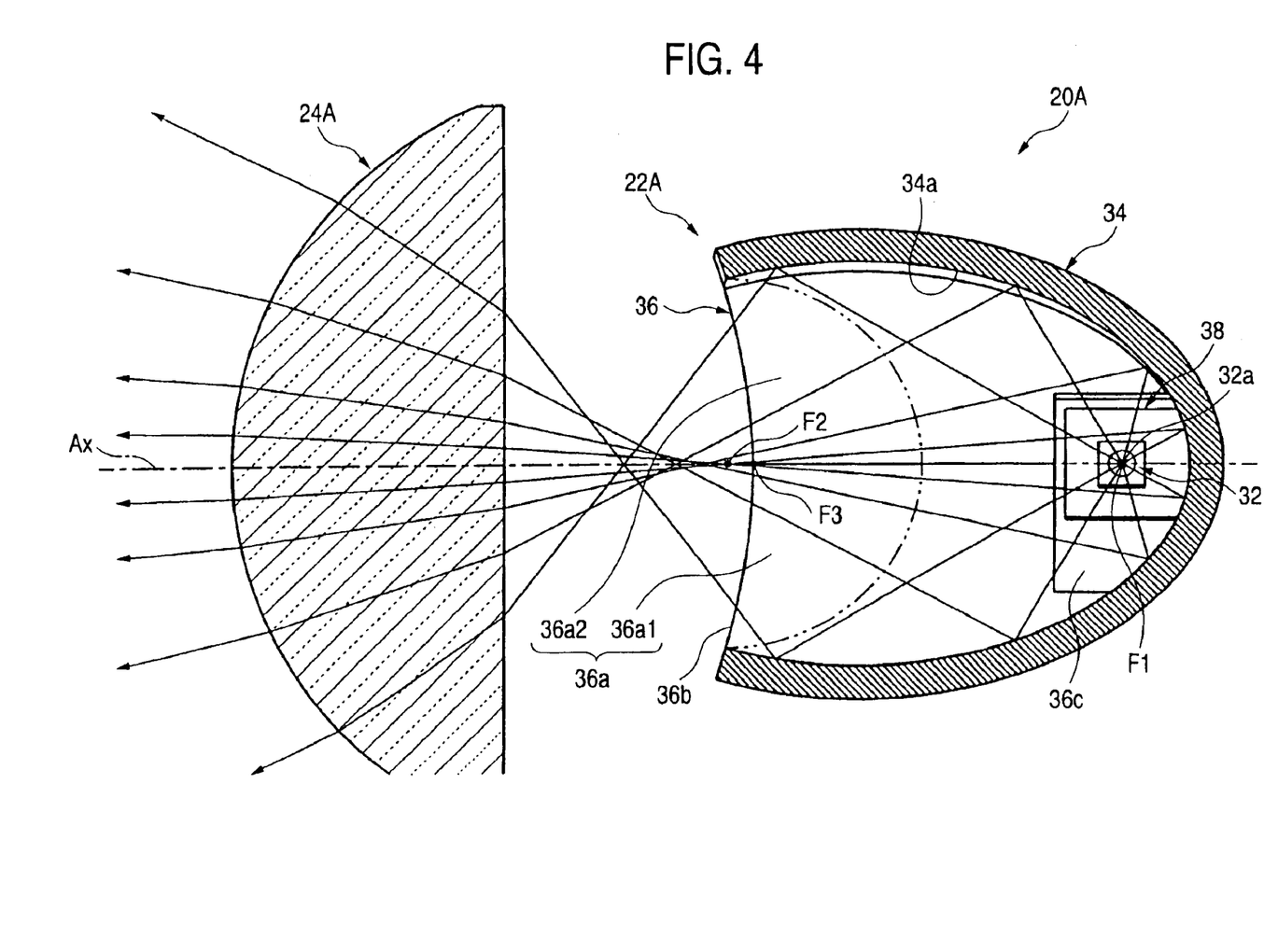
FIG. 4 is a plane cross-sectional view showing the first lamp unit.

FIG. 3 is a side cross-sectional view showing the lamp unit 20A as a single article. FIG. 4 is a plane cross-sectional view of the lamp unit.

As illustrated, the light source unit 22A of the lamp unit 20A is equipped with a light-emitting diode 32 serving as a light source; a reflector 34; and a light control member 36.

The light-emitting diode 32 is a white light-emitting diode having a single light-emitting chip 32a measuring about 1 mm square. The light-emitting diode 32 is arranged on the optical axis Ax while being supported on a substrate 38, and is oriented in a direction extending 15° rightward of the optical axis Ax with respect to the vertical upward direction.

The reflector 34 is a substantially dome-shaped member provided at a position higher than the light-emitting diode 32. The reflector 34 has a reflection surface 34a for reflecting the light output from the light-emitting diode 32 to be converged close to the optical axis Ax. The reflection surface 34a is formed such that a distance from the light-emitting diode 32 to the reflection surface 34a in the vertical direction assumes a value of about 10 mm.

The reflection surface 34a is formed into a substantially oblate spheroid shape which takes the optical axis Ax as a center axis. Specifically, the reflection surface 34a is set such that a cross-sectional profile thereof including the optical axis Ax is formed into a substantially oblate shape. An eccentricity is set so as to become gradually larger from the vertical cross section to the horizontal cross section. Here, a rear apex of an oblate constituting each cross section is set to a single position. The light-emitting diode 32 is arranged at a first focal point F1 of an oblate constituting a vertical cross section of the reflection surface 34a. The reflection surface 34a is arranged so as to reflect the light output from the light-emitting diode 32 to be converged forward close to the optical axis Ax. At that time, the light is converged substantially onto a second focal point F2 of the oblate within the vertical cross section including the optical axis Ax.

The projection lens 24A of the lamp unit 20 is formed from a plane convex lens having a convex front surface and a plane rear surface. Upper and lower sides of the projection lens 24A are chamfered. The projection lens 24A is placed on the optical axis Ax such that a rear focal point F3 is situated slightly rearward with respect to the second focal point F2 of the reflection surface 34a of the reflector 34. An image on a focal plane including the rear focal point F3 is projected forward as an inverted image.

The light control member 36 is a plate-like member provided below the reflector 34 and formed substantially into the shape of a chevron when the lamp is viewed from the front. A light control surface 36a subjected to reflection surface treatment is formed on the upper surface of the light control member 36. The light control member 36 reflects upward a portion of the light reflected from the reflection surface 34a by means of the light control surface 36a. Thus, the light control member 36 performs a control operation for converting the light to be output upward from the projection lens 24A into light output downward from the projection lens 24A, thereby enhancing the utilization factor of a luminous flux of the light output from the light-emitting diode 32.

Specifically, the light control surface 36a is formed from a horizontal cut-off formation surface 36a1 extending horizontally and leftward from the optical axis Ax, and an oblique cut-off formation surface 36a2 extending downward from the optical axis Ax in a rightward, oblique direction by an angle of 15°. A front edge of the light control surface 36a (i.e., a ridge line existing between the light control surface 36a and a front end surface 36b of the light control member 36) is formed so as to pass through the rear focal point F3 of the projection lens 24A. Of the light output from the light-emitting diode 32, a portion of the light reflected from the reflection surface 34a of the reflector 34 enters the light control surface 36a of the light control member 36. The remainder of the light enters the projection lens 24A without modification. At that time, the light having entered the light control surface 36a is reflected upward by the light control surface 36a, to thereby enter the projection lens 24A. The light is then output as downwardly-oriented light from the projection lens 24A.

The front-end surface 36b of the light control member 36 is formed such that lateral ends of the front-end surface are curved forwardly when viewed in plane so as to correspond to a field curvature of the projection lens 24A.

A substrate support section 36c is formed at the rear end of the light control member 36. The substrate 38 is secured on the light control member 36 by means of the substrate support section 36c. A lower edge section of the reflector 34 is fixed to the light control member 36. The light source unit 22A is secured on the lamp body 14 by way of an unillustrated bracket along with the projection lens 24A.

Figure 5:
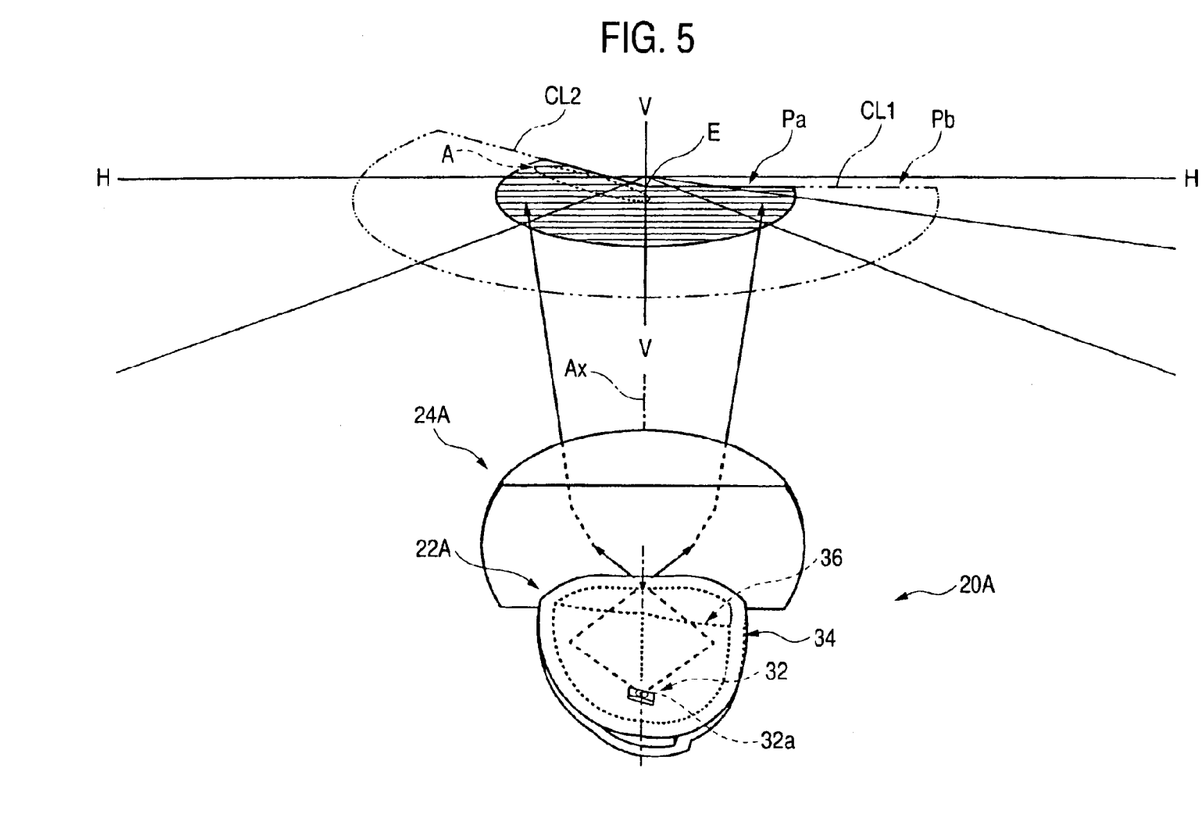
FIG. 5 is a view perspective view showing, from the back, a light distribution pattern to be formed on the virtual vertical screen by means of radiation of the light output from the first lamp unit along with the lamp unit.

FIG. 5 is a perspective view showing the hot-zone formation pattern Pa—which is to be formed on the virtual vertical screen bymeans of the light output forward fromthe lamp unit 20A—along the lamp unit 20A when viewed from the back.

As illustrated, the hot-zone formation pattern Pa is formed so as to surround the elbow point E below the horizontal cut-off line CL1 and the oblique cut-off line CL2. Thus, visibility of a distant area on a road surface ahead the vehicle is assured.

The light source of the lamp unit 20A is made up of the light-emitting diode 32 having a single light-emitting chip 32a. Therefore, the hot-zone formation pattern Pa is formed as a comparatively small light distribution pattern. This prevents deterioration of visibility of the distant area, which would otherwise be caused as a result of an area closer to the driver than the distant area on the road surface ahead of the vehicle becoming extremely bright.

The light control surface 36a of the light control member 36 has the horizontal cut-off formation surface 36a1 and the oblique cut-off formation surface 36a2 (see FIG. 4). Portions of the horizontal and oblique cut-off lines CL1, CL2 are formed as reverse images in the form of front edges. As a result of the lamp unit 20A of the embodiment being constituted in the manner set forth, the center of the hot-zone formation pattern Pa is made close to the elbow point E, thereby enhancing visibility of the distant area to a much greater extent.

A light distribution curve of the light output from the light-emitting diode generally has a distribution of luminous intensity, wherein maximum luminous intensity appears in the front of the light-emitting diode and the luminous intensity decreases as an angle with respect to the direction of the front of the light-emitting diode increases. In the embodiment, the light-emitting diode 32 is oriented in a direction extending 15° rightward of the optical axis Ax with reference to the upward vertical direction. Thereby, an area below the oblique cut-off line CL2 in the hot-zone formation pattern Pa; that is, an area "A" designated by broken lines shown in FIG. 5, is brightly radiated. As a result, the low-beam distribution pattern PL of left distribution light is made superior in distant visibility to a much greater extent.

In the embodiment, the two lamp units 20A are provided. Hence, the hot-zone formation pattern Pa in the low-beam light distribution pattern PL shown in FIG. 2 corresponds to double superimposition of the hot-zone formation pattern Pa shown in FIG. 5.

The configuration of the lamp unit 20B will now be described.

The lamp unit 20B is completely identical in configuration with the lamp unit 20A, except for the light source.

The light source of the lamp unit 20B is formed from a light-emitting diode 42 into which a plurality of light-emitting chips are packaged. Specifically, as shown in FIG. 6B, the light-emitting diode 42 is formed from a white light-emitting diode into which four light-emitting chips 42a, each measuring about 1 mm square, are arranged in a four-paned window. Therefore, the light-emitting diode 42 produces a light source luminous flux which is about four times that of the light-emitting diode 32 of the lamp unit 20A into which the single light-emitting chip 32a is packaged.

Figure 6A:
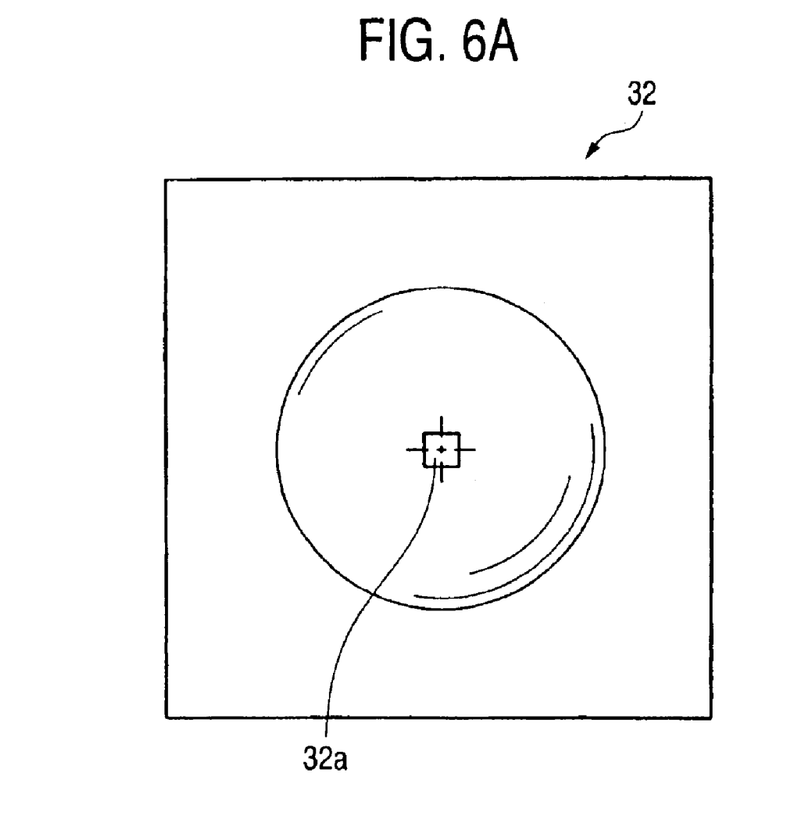
FIG. 6A is a plane view showing a light-emitting diode of the first lamp unit.
Figure 6B:
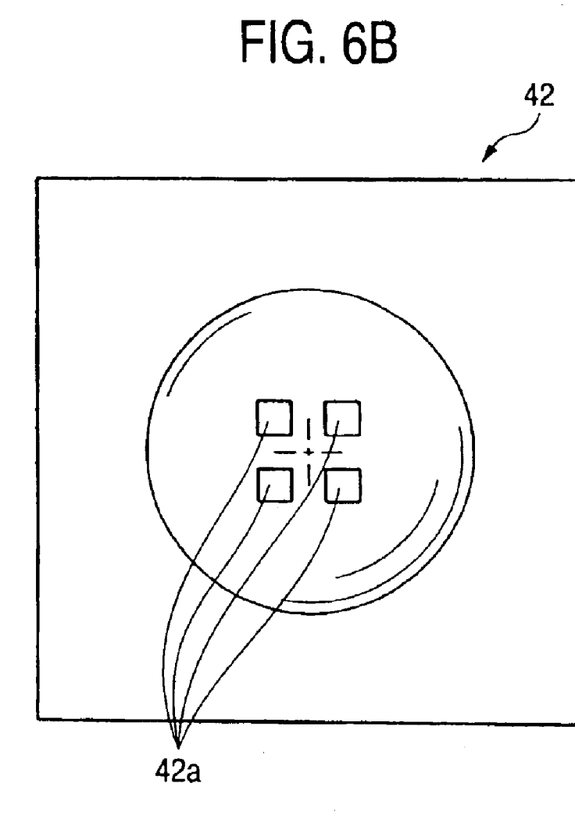
FIG. 6B is a plan view showing a light-emitting diode of a second lamp unit of the vehicle headlamp.

As shown in FIG. 6A, in the case of the light-emitting diode 32, the size of the single light-emitting chip 32a (i.e., measuring about 1 mm square) corresponds to the size of the light-emitting section. In contrast, in the case of the light-emitting diode 42, the size of a total of the four light-emitting chips 42a (i.e., an entire contour thereof measuring about 3 mm square) corresponds to the size of the light-emitting section. Hence, the light-emitting section becomes considerably large.

Consequently, as indicated by a two-dot chain line shown in FIG. 5, the cut-off line formation pattern Pb formed by radiation of the light output from the lamp unit 20B substantially assumes a shape formed by enlarging the hot-zone formation pattern Pa. At that time, the luminous flux of a beam output from the lamp unit 20B becomes approximately four times that of the beam output from the lamp unit 20A. Hence, the cut-off line formation pattern Pb becomes sufficiently bright, whereby the clear horizontal, oblique cut-off lines CL1, CL2 are formed.

In the embodiment, the two lamp units 20S are provided. The cut-off line formation pattern Pb of the low-beam light distribution pattern PL shown in FIG. 2 corresponds to double superimposition of the cut-off line formation pattern Pb shown in FIG. 5.

Next, the configuration of the lamp unit 20C will be described.

Figure 7:
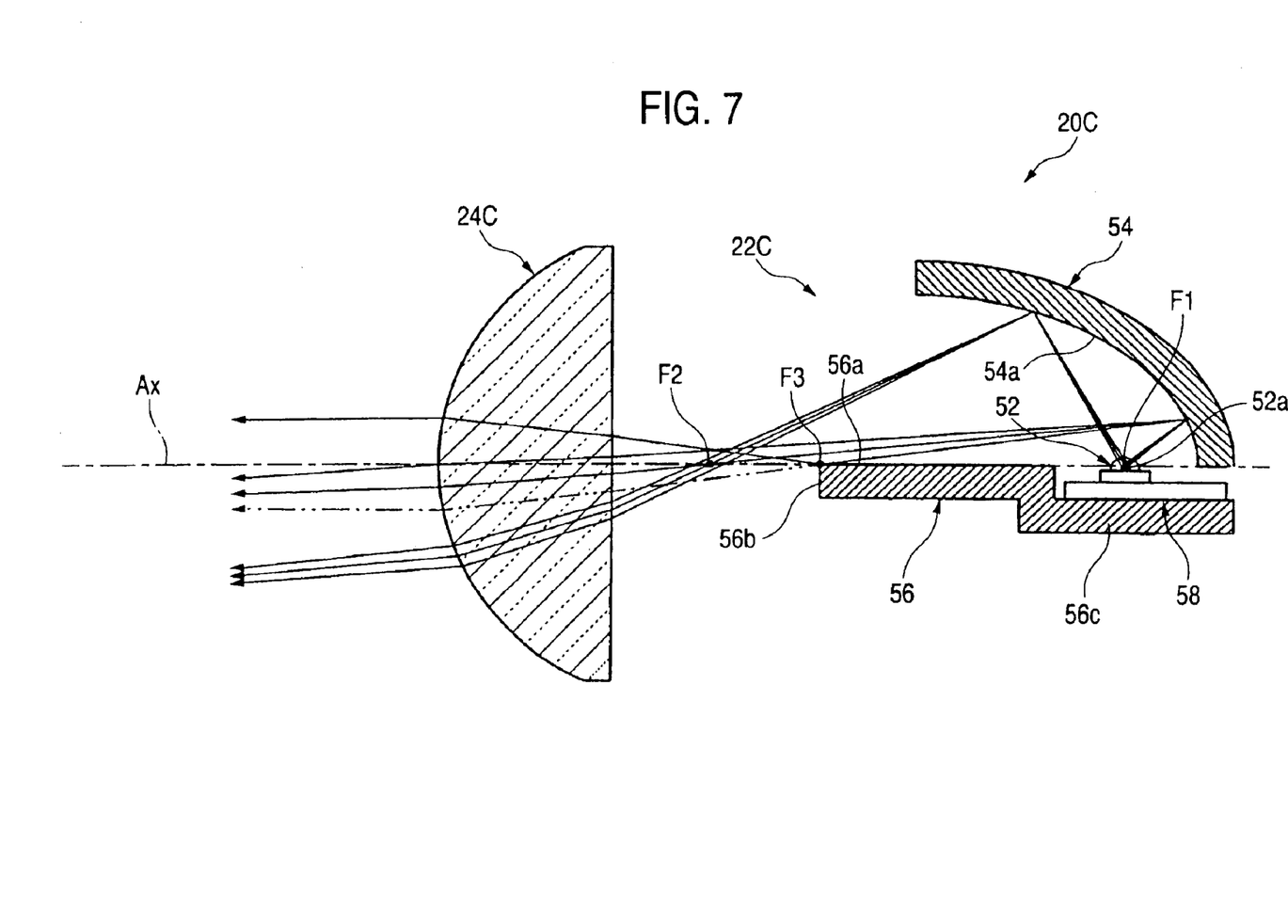
FIG. 7 is a side cross-sectional view showing another second lamp unit of the vehicle headlamp as a single article.
Figure 8:
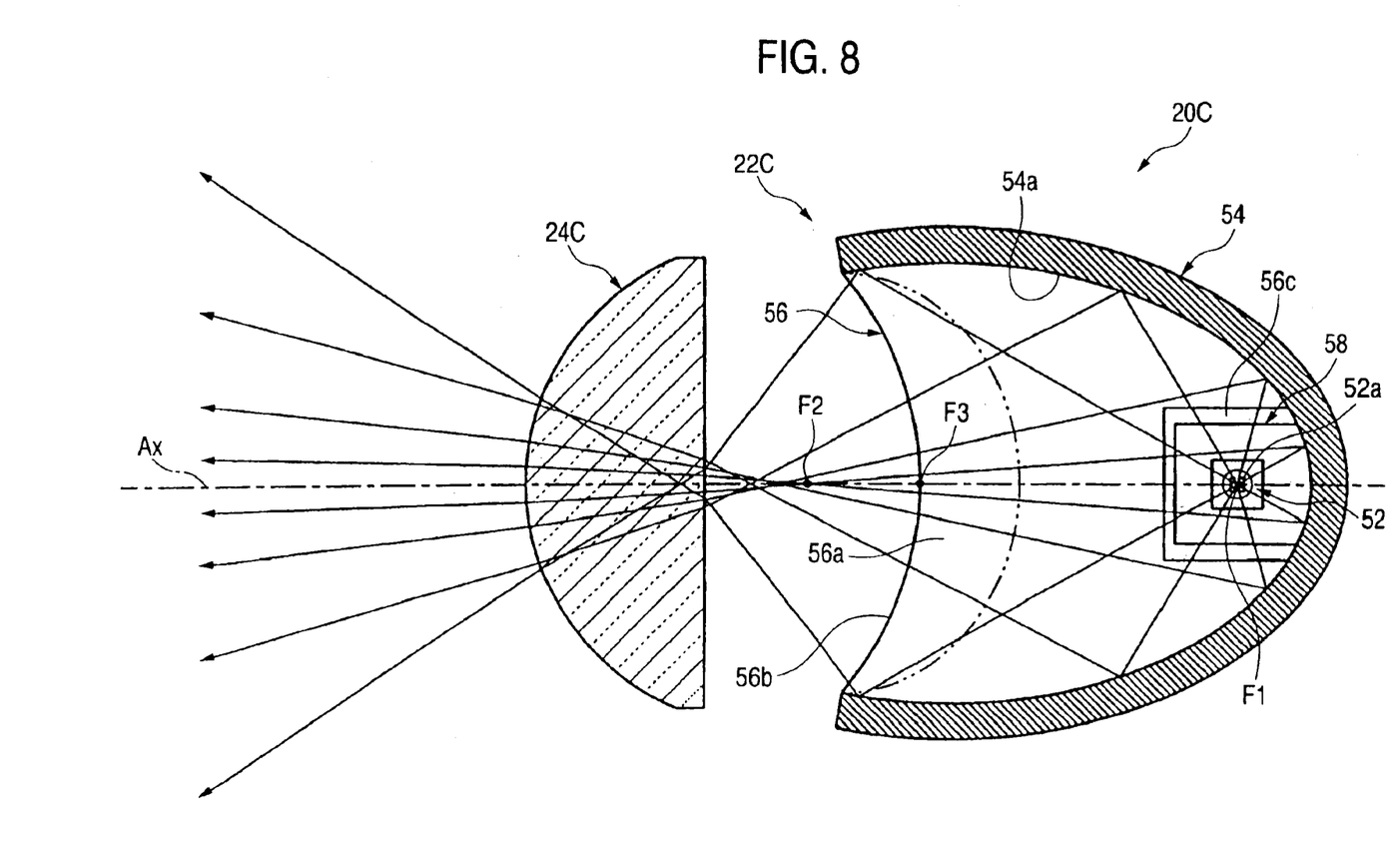
FIG. 8 is a plane view showing the second lamp unit.

FIG. 7 is a side cross-sectional view showing the lamp unit 20C as a single article. FIG. 8 is a plane cross-sectional view of the lamp unit.

As illustrated, the light source unit 22C of the lamp unit 20C is equipped with a light-emitting diode 52 serving as a light source, a reflector 54, and a light control member 56.

Like the light-emitting diode 42 of the lamp unit 20B, the light-emitting diode 52 is formed from a white light-emitting diode into which the four light-emitting chips 42a, each measuring about 1 mm square, are arranged in the shape of a four-paned window. Here, the light-emitting diode 52 is oriented in a vertically upward direction on the optical axis Ax while being supported on a substrate 58.

The reflector 54 is a substantially dome-shaped member provided at a position above the light-emitting diode 52 and has a reflection surface 54a for reflecting the light output from the light-emitting diode 52 to be converged close to the optical axis Ax. The reflection surface 54a is formed such that a vertical distance from the light-emitting diode 52 to the reflection surface 54a assumes a value of about 10 mm.

The reflection surface 54a is formed into a substantially oblate, spheroid shape which takes the optical axis Ax as a center axis. Specifically, the reflection surface 54a is set such that a cross-sectional profile including the optical axis Ax is formed into a substantially oblate shape and such that eccentricity becomes gradually larger from a vertical cross section to a horizontal cross section. Here, the rear apices of oblates constituting the respective cross sections are set to a single position. The light-emitting diode 52 is placed at a first focal point F1 of the oblate constituting the vertical cross section of the reflection surface 54a. As a result, the reflection surface 54a reflects the light output from the light-emitting diode 52 to be converged forward close to the optical axis Ax. At that time, the light is substantially converged on a second focal point F2 of the oblate within the vertical cross section including the optical axis Ax.

A front surface of the projection lens 24C of the lamp unit 20C is formed from a convex surface, and a rear surface of the same is formed from a plano-convex lens. A rear focal point F3 of the projection lens 24C is placed on the optical axis Ax so as to become situated at a position a certain distance rearward of the second focal point F2 of the reflection surface 54a. As a result, an image formed on a focal point surface including the rear focal point F3 is projected forward as a reverse image.

The light control member 56 is a plate-shaped member provide data position below the reflector 54. The light control member 56 is formed into a straight line when the lamp is viewed from the front. A light control surface 56a subjected to reflection surface treatment is formed on an upper surface of the light control member 56. The light control member 56 performs control operation for converting the light to be output upwardly from the projection lens 24C into light to be output downwardly from the projection lens 24C, by means of causing a portion of the light reflected from the reflection surface 54a to be reflected upwardly by the light control surface 56a. As a result, the availability factor of the light output from the light-emitting diode 52 is enhanced.

From among the light rays exiting the light-emitting diode 52, the light ray reflected from the reflection surface 54a of the reflector 54 enters the light control surface 56a of the light control member 56, and the remainder enters the projection lens 24C without modification. At that time, the light ray entered the light control surface 56a is reflected upwardly by the light control surface 56a, to thereby enter the projection lens 24C. The light then exits the projection lens 24C as downward light.

A front end face 56b of the light control member 56 is formed such that lateral ends of a front end face 56b are curved forward so as to correspond to the field curvature of the projection lens 24C when viewed in plane.

A substrate support section 56c is formed on a rear end section of the light control member 56. The substrate 58 is fastened to the substrate support section 56c of the light control member 56. A lower-end edge section of the reflector 54 is secured on the light control member 56. The light source unit 22C is secured on the lamp body 14 by way of an unillustrated bracket, along with the projection lens 24C.

Figure 9:
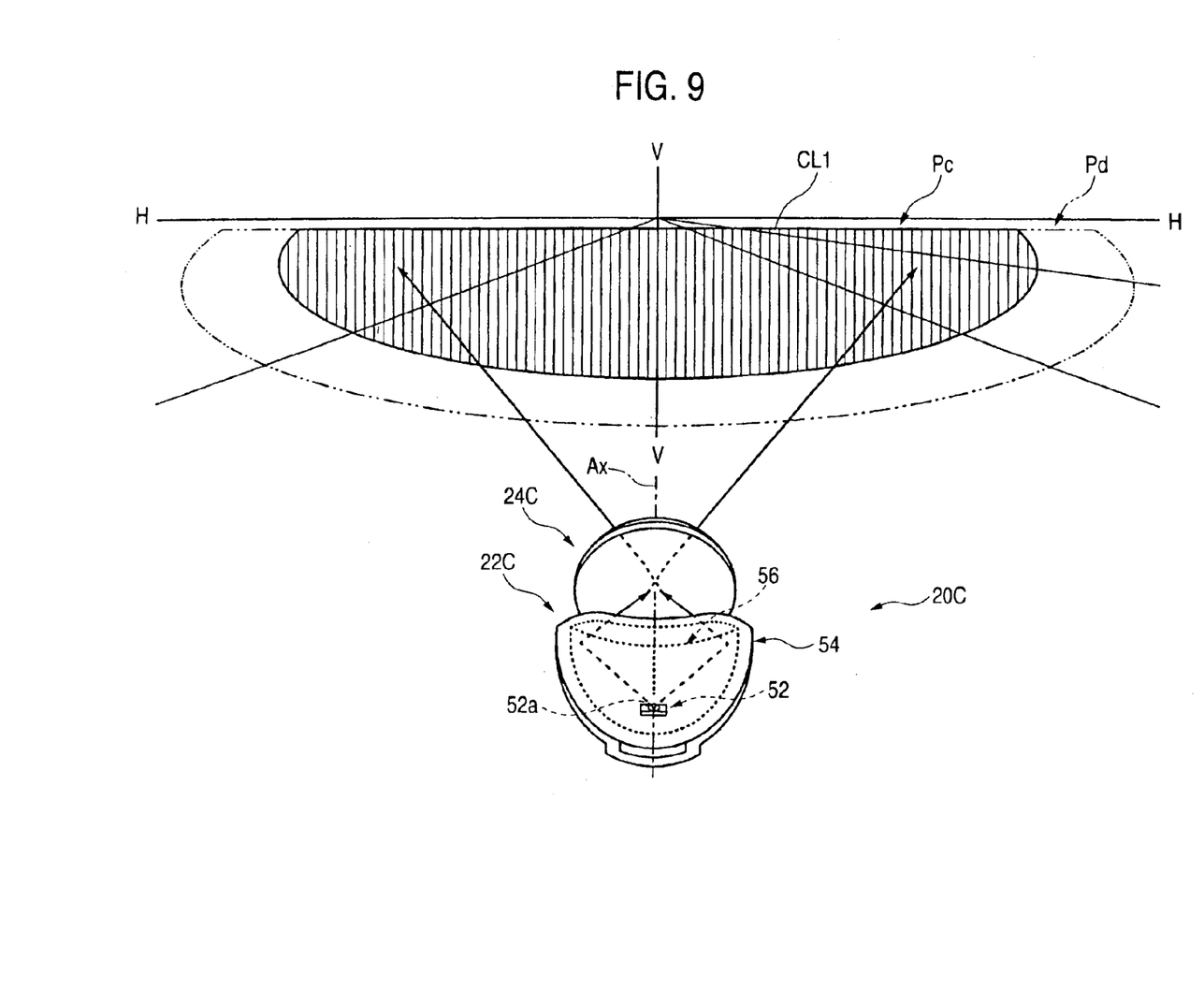
FIG. 9 is a perspective view showing, from the back, a light distribution pattern to be formed on the virtual vertical screen by means of radiation of the light output from the second lamp unit along with the lamp unit.

FIG. 9 is a view perspectively showing, from the back, the middle diffusion pattern Pc that is formed on the virtual vertical screen by means of the light output forward from the lamp unit 20C in conjunction with the lamp unit 20C.

As illustrated, the middle diffusion pattern Pc is formed so as to laterally, widely spread with respect to line V-V, which is a vertical line passing through H-V, thereby illuminating a wide range of the road surface ahead of the vehicle. At that time, the illuminating diode 52 of the lamp unit 20C has four light-emitting chips 52a. Hence, the middle diffusion pattern Pc becomes sufficiently bright. An upper edge of the middle diffusion pattern Pc is formed as an inverse image of the front edge of the light control surface 56a of the light control member 56, so as to extend horizontally at the same height as that of the horizontal cut-off line CL1, thereby enhancing the visibility of laterally distant areas.

In the embodiment, the two lamp units 20C are provided. Hence, the middle diffusion pattern Pc in the low-beam light distribution pattern PL shown in FIG. 2 corresponds to superimposition of the middle diffusion pattern Pc shown in FIG. 9.

The configuration of the lamp unit 20D will now be described.

The lamp unit 20D is substantially identically in configuration with the lamp unit 20C. However, the light source unit 22D differs in size from the lamp unit 20C.

Figure 10:
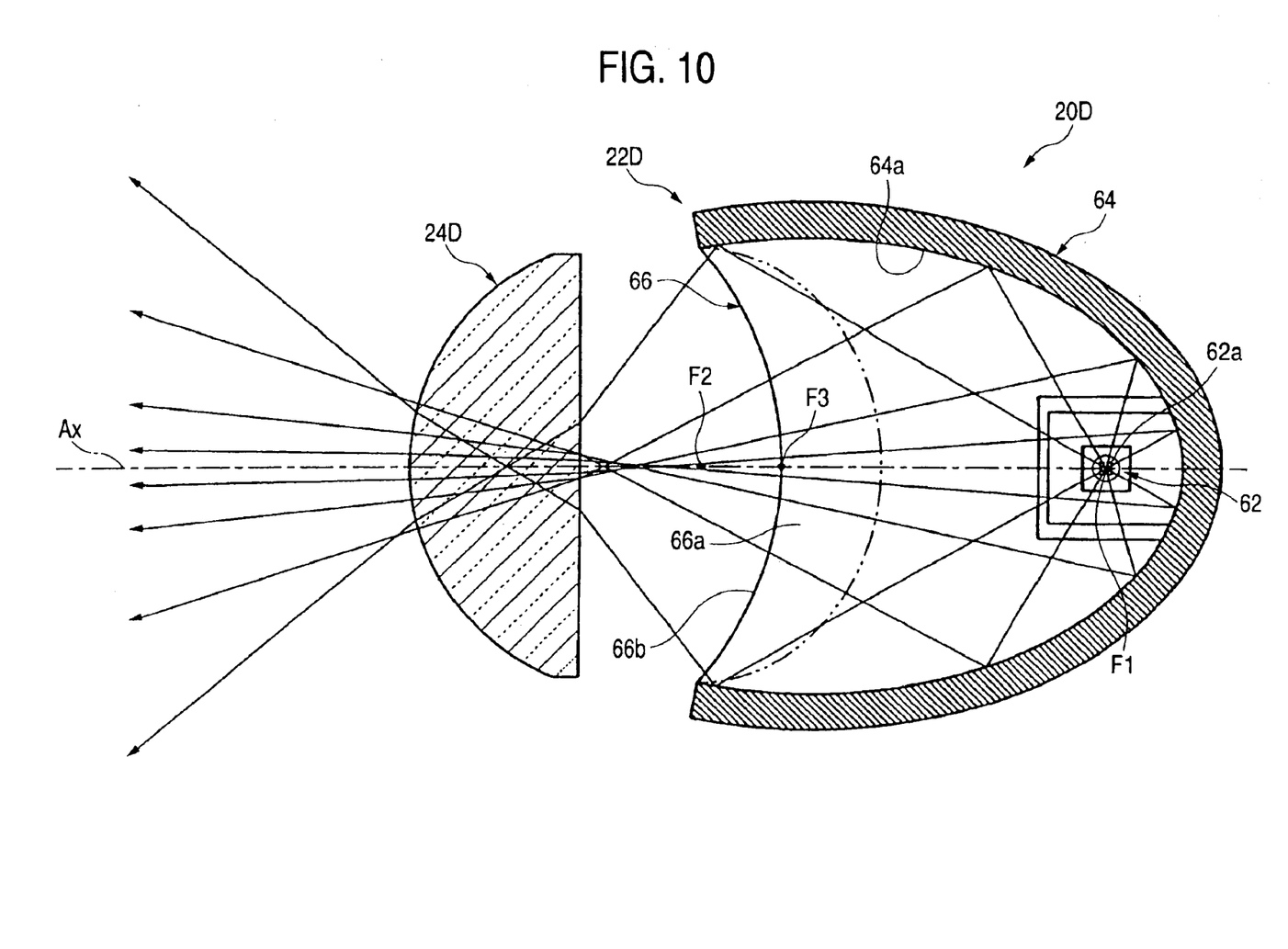
FIG. 10 is a plane cross-sectional view showing another second lamp unit of the vehicle headlamp as a single article.

Specifically, as shown in FIG. 10, the lamp unit 20D has the projection lens 24D identical with the projection lens 24C of the lamp unit 20C. The light source unit 22D has a light-emitting diode 62, a reflector 64, and a light control member 66. Here, in the light source unit 22D, the reflector 64 and the light control member 66 assume shapes which are similar to and slightly larger than the reflector 54 and the light control member 56 in the light source unit 22C of the lamp unit 20C, with reference to the position of the rear focal point F3 of the projection lens 24D. More specifically, a reflection surface 64a of the reflector 64 is formed such that a vertical distance from the light-emitting diode 62 to the reflection surface 64a assumes a value of about 14 mm.

As in the case of the light-emitting diode 52 of the lamp unit 20C, the light-emitting diode 62 is formed from white light-emitting diodes into which four light-emitting chips 62a, each measuring about 1 mm square, are arranged in the form of a four-paned window.

The light source unit 22D of the lamp unit 20D is larger than the light source unit 22C of the lamp unit 20C. As indicated by the two-dot chain line shown in FIG. 9, a wide diffusion pattern Pd formed on the virtual vertical screen through radiation of light from the lamp unit 20D assumes a shape into which the middle diffusion pattern Pc has been substantially enlarged. At that time, a luminous flux of the beam radiated from the lamp unit 20D is identical in quantity with that of the beam output from the lamp unit 20C. Hence, the wide diffusion pattern Pd becomes slightly lower in luminous intensity than the middle diffusion pattern Pc.

In the embodiment, only one lamp unit 20D is provided. Hence, the wide diffusion pattern Pd in the low-beam light distribution pattern PL shown in FIG. 2 becomes identical with the wide diffusion pattern Pd shown in FIG. 9.

As has been described in detail, the vehicle head lamp 10 of the embodiment is constructed to form a predetermined light distribution pattern through radiation of light output from the plurality of lamp units 20A, 20B, 20C, and 20D. Employed as the plurality of lamp units 20A, 20B, 20C, and 20D are the lamp unit 20A having a light source formed from the light-emitting diode 32 into which the single light-emitting chip 32a is packaged, and lamp units 20B, 20C, and 20D having light sources formed from the light-emitting diodes 42, 52, and 62 into which the plurality of light-emitting chips 42a, 52a, and 62a are packaged. Hence, the following working-effect can be yielded.

Specifically, the light source of the lamp unit 20A is formed from the light-emitting diode 32 into which the single light-emitting chip 32a is packaged. A smaller light distribution pattern can be formed through radiation of the light output from the lamp unit 20A. In the meantime, light sources of the lamp units 20B, 20C, and 20D are formed from the light-emitting diodes 42, 52, and 62 into which a plurality of light-emitting chips 42a, 52a, and 62a are packaged. Light emission areas of the light sources become large. Hence, a large, bright light distribution pattern can be formed through radiation of light output from the lamp units 20B, 20C, and 20D.

Active use of the lamp units 20B, 20C, and 20D enables assurance of required brightness without involvement of an increase in the number of lamp units. Appropriate use of the lamp unit 20A enables easy formation of a spot-like light distribution pattern at a predetermined position in the form of a predetermined shape. As a result, the low-beam light distribution pattern PL of the vehicle headlamp 10 to be formed as a synthetic light distribution pattern of the light distribution pattern can be elaborately controlled so as to assume a desired distribution of luminous intensity.

In the embodiment, the lamp unit 20A is configured to effect radiation for forming the hot zone HZ of the low-beam light distribution pattern FL. The lamp units 20B, 20C, and 20D are configured to effect radiation for forming a diffusion region of the low-beam light distribution pattern FL. Hence, the vertical width of the hot zone HZ can be prevented from becoming larger than required while required brightness of the low-beam light distribution pattern PL is ensured. As a result, sufficient visibility of the distant area on the road surface ahead of the vehicle can be ensured.

Particularly, as in the case of the vehicle headlamp 10 of the embodiment, when the vehicle headlamp is a low-beam headlamp, the hot zone HZ must be formed so as not to generate upward light responsible for glaring. Use of the lamp unit 20A capable of forming a small light distribution pattern as a unit for forming a hot zone is particularly effective.

The vehicle headlamp 10 of the embodiment has seven lamp units 20A, 20B, 20C, and 20D. Of the lamp units, the lamp unit 20A having the light-emitting diode 32, as the light source, into which the single light-emitting chip 32a is packaged has been described to be provided in the number of two. The total number of lamp units 20A, 20B, 20C, and 20D and the number of lamp units 20A may be changed, as appropriate.

In the embodiment, the light-emitting chips 42a, 52a, and 62a packaged into the light-emitting diodes 42, 52, and 62 have been described as being provided in the number of four. However, the light-emitting chips may be packaged in the number of two, three, five, or more. At this time, the light-emitting chips may be arranged, for example, in a straight line, a circular-arch pattern, or an annular pattern in place of a four-paned window, as in the case of the embodiment.

The embodiment has been described such that the respective lamp units 20A, 20B, 20C, and 20D are projector-type lamp units. However, as a matter of course, lamp units of other types may be employed.

Figure 11:
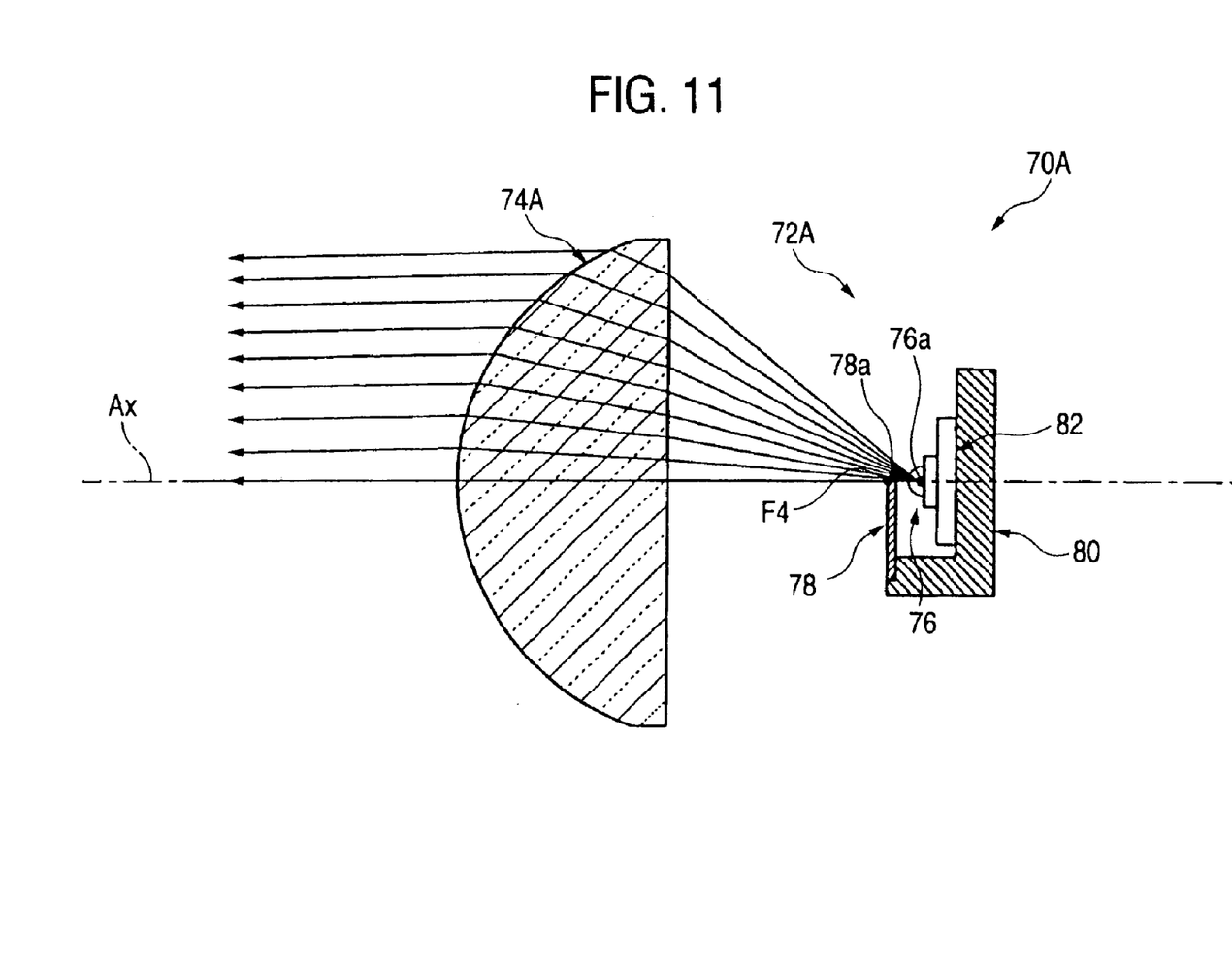
FIG. 11 is a view analogous to FIG. 3, showing a modification of the first lamp unit.

For instance, a lamp unit 70A of direct projection type as shown in FIG. 11 can be used as the first lamp unit in place of the lamp unit 20A.

The lamp unit 70A is formed from a light source unit 72A and a condenser lens 74A provided ahead thereof.

The light source unit 72A has a light-emitting diode 76 serving as a light source, and a shade 78.

The light-emitting diode 76 is analogous in configuration to the light-emitting diode 32 of the lamp unit 20A. The light-emitting diode 76 is fastened to a support member 80 via a substrate 82 while a light-emitting chip 76a is oriented forward of the headlamp on the optical axis Ax. The shade 78 is a plate-like member which extends along a vertical plane orthogonal to the optical axis Ax ahead of and in the vicinity of the light-emitting diode 76. An upper edge 78a of the shade 78 is fixed to the support member 80 so as to pass the optical axis Ax horizontally.

A front surface of the condenser lens 74A is formed from a convex surface, and a rear surface of the same is formed from a plano-convex lens. The condenser lens 74A is arranged on the optical axis Ax such that the rear focal point F4 is situated at a point of intersection between the upper edge 78a of the shade 78 and the optical axis Ax.

In the lamp unit 70A, the light output from the light-emitting diode 76 is converted into substantially-collimated light which converges slightly closer to the optical axis Ax by means of the condenser lens 74A, to thereby reflect and radiate the light forward. Of the light rays output from the light-emitting diode 76, the light ray traveling downward with reference to the optical axis Ax is shielded by the shade 78, to thereby prevent the output of upward-traveling light ahead of the lamp.

Such a lamp unit 70A of direct radiation type is suitable for forming a spot-like light distribution pattern. Hence, so long as the lamp unit 70A is used in place of the lamp unit 20A, a small hot zone can be formed more readily.

In the embodiment, the hot zone HZ is formed by means of radiation of light output from the lamp unit 20A having the light-emitting diode 32 into which a single light-emitting chip 32a is packaged. In addition, another spot-shaped light distribution pattern, such as a light distribution pattern for radiating an overhead sign, can also be formed.

The embodiment has been described by reference to the case where the vehicle headlamp 10 is a low-beam headlamp. However, even when the vehicle headlamp is a high-beam headlamp, so long as a lamp unit having as a light source a light-emitting diode into which a single light-emitting chip is packaged and a lamp unit having as a light source a light-emitting diode into which a plurality of light-emitting chips are packaged are used in combination, as appropriate, a high-beam light distribution pattern having a distribution of luminous intensity which gradually decreases from the center to the periphery can be formed.

Figure 12:
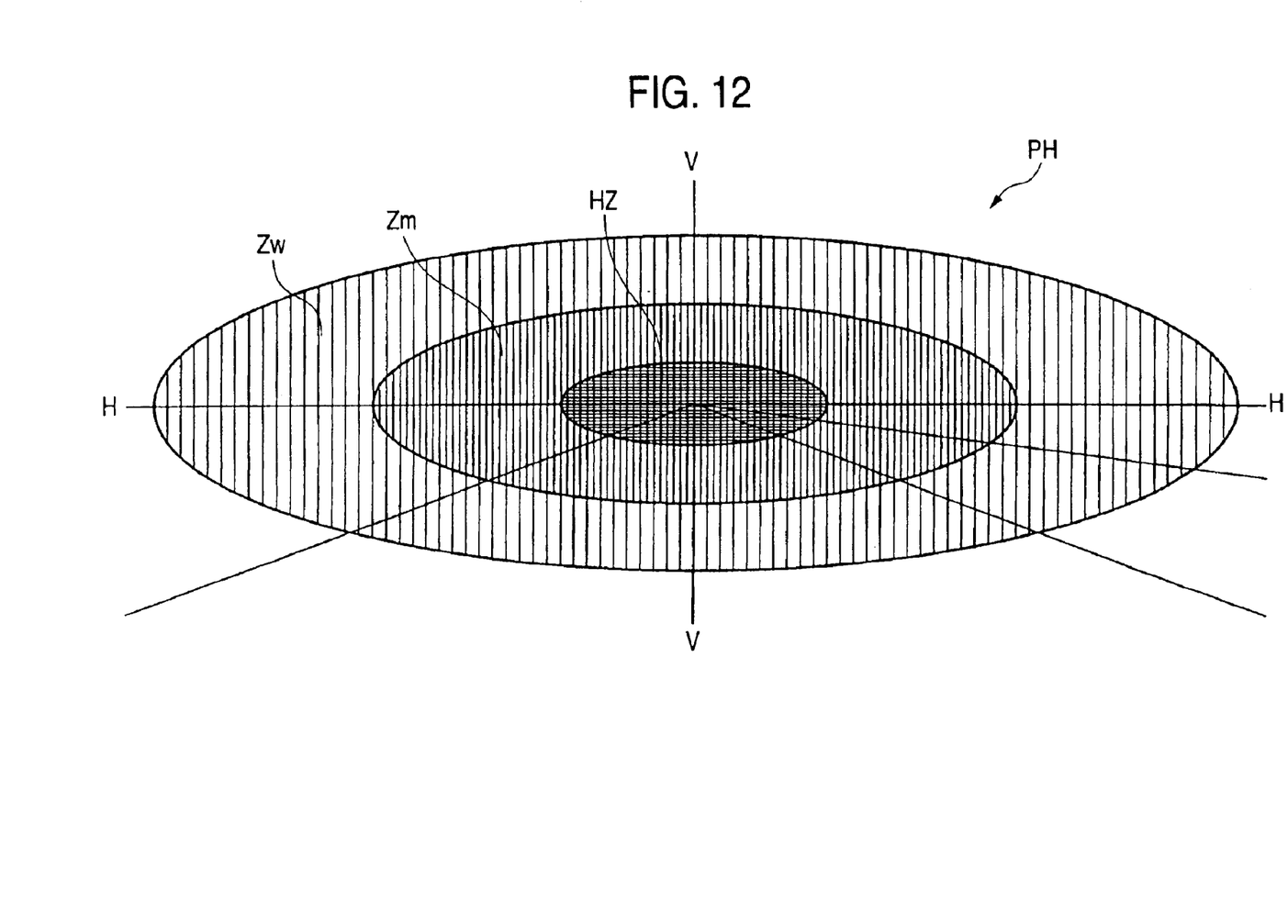
FIG. 12 is a perspective view showing a high-beam light distribution pattern formed on the virtual vertical screen by means of radiation of the light output from the vehicle headlamp when the vehicle headlamp is configured as a headlamp for high-beam purpose.

As shown in FIG. 12, there can be formed, e.g., a high-beam light distribution pattern PH having a distribution of luminous intensity in which intensity decreases from the center to the periphery in order of the hot zone HZ, the middle diffusion area Zm, and the wide diffusion area Zw. At that time, the hot zone HZ is preferably formed through radiation of light output from the lamp unit that takes, as a light source, a light-emitting diode into which a single light-emitting chip is packaged. Also, the middle diffusion area Zm and the wide diffusion area Zw are preferably formed through use of a lamp unit having as a light source a light-emitting diode into which a plurality of light-emitting chips are packaged.

What is claimed is:

1. A vehicle headlamp operable to form a predetermined light distribution pattern, comprising:

first and second lamp units employing semiconductor light-emitting elements as light sources, wherein the first lamp unit has a light source formed from a semiconductor light-emitting element into which a single light-emitting chip is packaged, and the second lamp unit has a light source formed from a semiconductor light-emitting element into which a plurality of light-emitting chips as a single light source are packaged;

the first lamp unit is constructed so as to effect radiation of light to be used for forming a hot zone of the light distribution pattern; and the second lamp unit is constructed so is to effect radiation of light to be used for forming a diffusion region of the light distribution pattern.

2. The vehicle headlamp according to claim 1, wherein the light distribution pattern is a low-beam light distribution pattern.

3. The vehicle headlamp according to claim 2, wherein a luminous intensity of the low-beam light distribution pattern is arranged such that luminous intensity becomes gradually lower from the center of the pattern toward an outer edge section of the light-distribution pattern.

4. The vehicle headlamp according to claim 3, wherein the low-beam light distribution pattern includes:

a hot zone formation pattern;

a cut-off line formation pattern formed as a light distribution pattern larger than the hot zone formation pattern; and an intermediate diffusion pattern and a wide diffusion pattern which are light distribution patterns for imparting diffusion to the low-beam light distribution pattern, wherein the intermediate diffusion pattern is formed as a light distribution pattern which is larger than the cut-off line formation pattern, and the wide diffusion pattern is formed as a light distribution pattern which is larger than the intermediate diffusion pattern.

5. A vehicle headlamp according to claim 1, wherein the light-emitting elements are light-emitting diodes.

6. A vehicle headlamp according to claim 2, wherein the light-emitting elements are light-emitting diodes.

7. A vehicle headlamp according to claim 3, wherein the light-emitting elements are light-emitting diodes.

8. A vehicle headlamp according to claim 4, wherein the light-emitting elements are light-emitting diodes.

* * * * *